US005397952A

United States Patent [19]

Decker et al.

[11] Patent Number: 5,397,952

[45] Date of Patent: Mar. 14, 1995

[54] BRUSH HOLDER FOR MECHANICALLY COMMUTATED ELECTRIC MOTORS

[75] Inventors: Werner Decker, Buehl; Hugo Herrmann, Lauf, both of Germany

[73] Assignee: Robert Bosch GmbH, Stuttgart, Germany

[21] Appl. No.: 204,948

[22] Filed: Mar. 2, 1994

[30] Foreign Application Priority Data

Mar. 10, 1993 [DE] Germany ........................ 43 07 451.0

[51] Int. Cl.[6] .............................................. H02K 13/00

[52] U.S. Cl. .................................... 310/242; 310/239; 310/245; 310/249

[58] Field of Search ............... 310/239, 240, 241, 242, 310/244, 245, 246, 247, 249

[56] References Cited

U.S. PATENT DOCUMENTS

| | | | |
|---|---|---|---|
| 3,127,533 | 3/1964 | Gardner, Jr. | 310/242 |
| 3,277,325 | 10/1966 | Staff | 310/239 |
| 3,430,084 | 2/1969 | Hall et al. | 310/239 |
| 3,430,915 | 3/1969 | Vogelsberg | 310/242 |
| 3,983,432 | 9/1976 | Rankin | 310/242 |
| 4,389,588 | 6/1983 | Rankin | 310/242 |
| 5,059,846 | 10/1991 | Concannon | 310/239 |

FOREIGN PATENT DOCUMENTS 0397973 11/1990 European Pat. Off. .

*Primary Examiner*—R. Skudy
*Attorney, Agent, or Firm*—Michael J. Striker

[57] ABSTRACT

A brush holder for mechanically commutated electric motors has a support plate, a shaft-like guiding container mounted on the support plate for guiding a sliding brush pressed by a spring force against the commutator of an electric motor. The guiding container has side walls extending transverse to the support plate and provided with legs. A pressing spring is formed as a strip-shaped flat spring and has end portions which are oppositely rolled to form rollers abutting against the legs of the guiding container on surfaces of the legs which face the commutator and also have a central portion arranged to load an end surface of the sliding brush facing away from the commutator. The side walls of the guiding container are provided with recesses which are open to an end facing away from the commutator, have a depth extending to the supporting legs and have a width which is greater than a width of the pressing spring, each of the supporting legs at a transition to a side wall of the guiding container being provided with a slot which is open toward a side of the supporting leg facing away from the support plate, has a depth at least corresponding to the width of the pressing spring, and also has a longitudinal side merging into the recess located in a respective one of the side walls of the guiding container.

5 Claims, 3 Drawing Sheets

BRUSH HOLDER FOR MECHANICALLY COMMUTATED ELECTRIC MOTORS

BACKGROUND OF THE INVENTION

The present invention relates generally to a brush holder for mechanically commutated electric motors.

More particularly, it relates to a brush holder which has a support plate and a shaft-like guiding element for sliding brushes pressed against a collector of an electric motor by a spring force, with strip-shaped flat springs rolled at their both end portions so as to be supported on legs extending transverse to the side wall of the guiding element.

Brush holders of the above mentioned general type are known in the art. One of such brush holders is disclosed, for example, in the European patent document EP-OS 0 397 973. In this brush holder for mounting of the brush holder the pressing spring must be guided with its portion located between the rollers by the guiding element formed as a guiding container, so that the spring portions are located between the inner wall of the container and the sliding brushes. Such mounting is complicated and expensive.

SUMMARY OF THE INVENTION

Accordingly, it is an object of the present invention to provide a brush holder for mechanically commutated electric motors of the above mentioned general type, which avoids the disadvantages of the prior art.

In keeping with these objects and with others which will become apparent hereinafter, one feature of the present invention resides, briefly stated, in a brush holder in which both side walls of the guiding container are provided with edge-open recesses facing toward their end facing away from the commutator and formed so that the depth of the recesses extends to a supporting leg, the width of the recesses is greater than the width of the pressing spring, and each supporting leg is provided in a transition to a side wall of the container with a slot which is an edge-open toward the side of the supporting leg facing away from the support plate and has a depth corresponding at least to the width of the pressing spring and a longitudinal side merging into the recess located in its side wall of the guiding container.

When the brush holder is designed in accordance with the present invention, the pressing spring can be displaced over the edge-open side of the slot to its working position, in which the central portion of the pressing spring located between the rollers comes to abutment in the recesses against the side walls of the guiding container.

In accordance with another feature of the present invention, the guiding container is provided with bending tongues on its rear side facing the support plate.

Still another feature of the present invention is that the guiding container in its front side facing away from the support plate is provided with a throughgoing slot for a wire connected with the sliding brush and located in the working current circuit of the electric motor, which wire is edge-open toward the side of the guiding container facing away from the commutator.

Finally, the supporting legs can have a length which is greater than the radius of the rollers, and the free end portions of the leg can be bent to the rollers.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
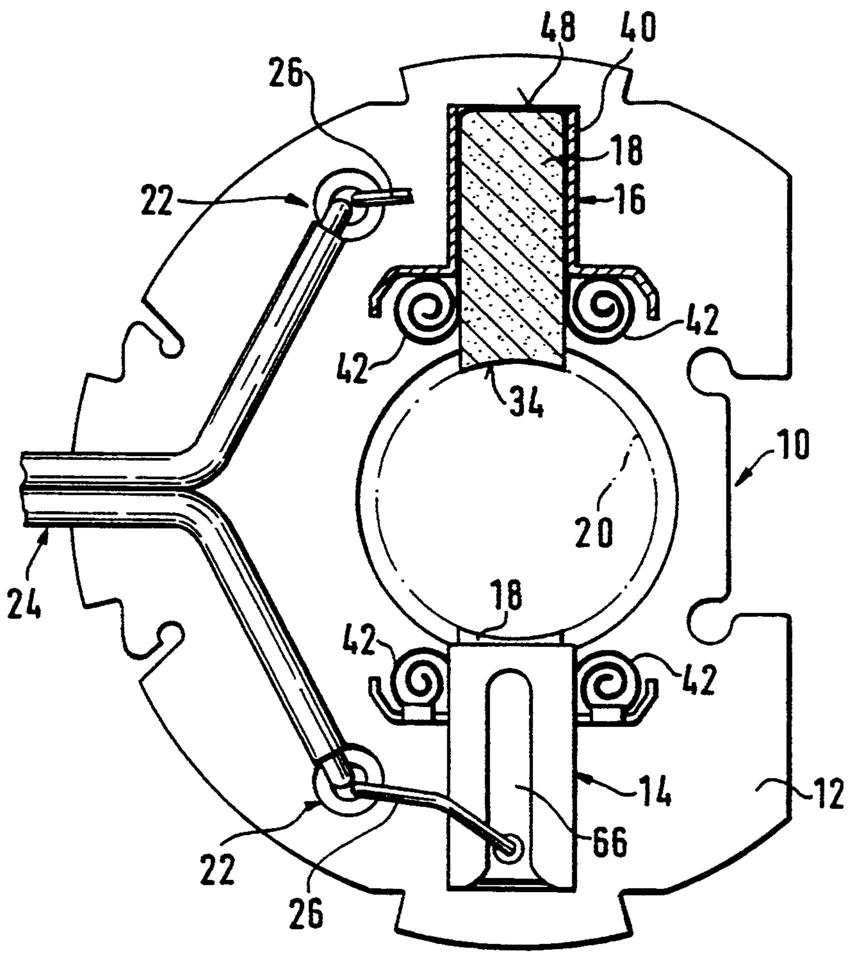
FIG. 1 is a plan view of a support plate for brushes, with two sliding brushes arranged in their guiding container.

A brush holder 10 shown in FIG. 1 is a part of a not shown mechanically commutated electric motor. It has a support plate 12 which is fixedly connected with a frame or a housing of the motor. In the shown embodiment two shaft-like guiding containers 14 and 16 are mounted on the support plate 12. A sliding brush 18 is displaceably arranged in the shaft of each of the guiding containers 14 and 16. The guiding containers 14 an 16 are oriented so that the displacement direction for the sliding brushes 18 extend substantially radially to a commutator of the electric motor, which is identified in a dash-dot line in FIG. 1. Contact points 22 are further arranged on the support plate 12 and connected with a power cable 24 leading to the working current circuit of the electric motor. Brush wires 26 lead from the contact points 22 to the sliding brushes 18.

Figure 3:
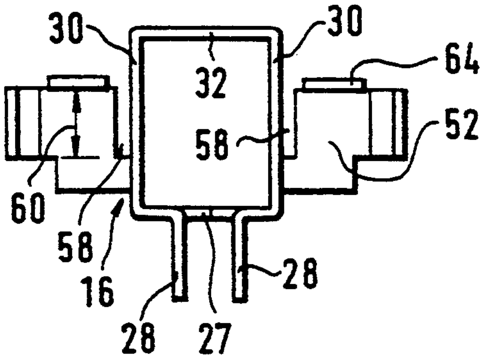
FIG. 3 is a view showing the guiding container of FIG. 2 from below.

Since both guiding containers 14 and 16 are completely identical, their construction is illustrated by one guiding container 16 shown in FIGS. 2–5. The guiding container 16 is tubular and has a substantially rectangular or square cross-section. This can be seen in particular from FIG. 3. It faces with its rear end wall 27 toward the support plate 12 and connected by bending tongues 28 with the support plate in a known manner. Two side walls 30 shown in FIG. 3 are connected with the rear wall 27. In the mounted condition of the guiding container 16 they extend transversely to the plane of the supporting plate 12. Both side walls 30 merge into a front wall 32 which extends at a distance from the rear wall 27 and substantially parallel to it. The cross-sectional shape of the sliding brush 18 is determined with respect to the thusly produced cross-sectional shape of the shaft interior so that it is displaceable in direction of the shaft axis without a substantial play.

Figure 6:
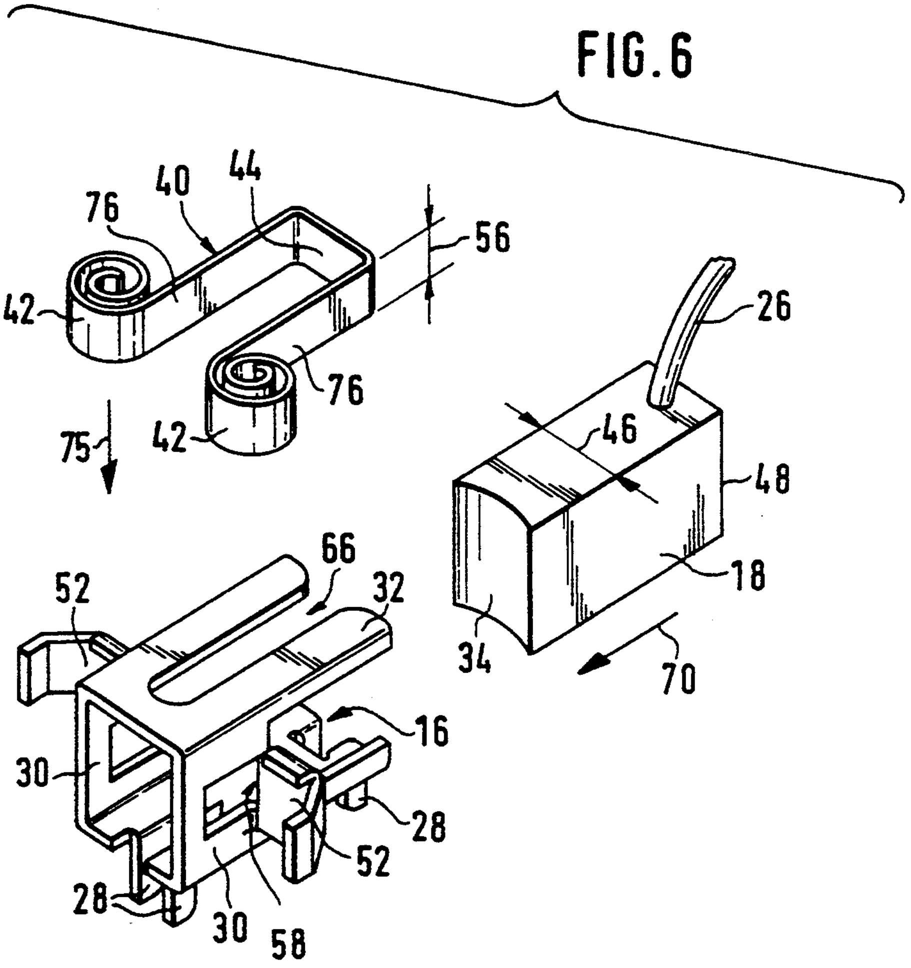
FIG. 6 is an exploded view of a brush container, a sliding brush associated with it, and an associated pressing spring.

The sliding brush 18 in operational condition abuts with a sliding surface 34 shown in FIG. 6 against a surface of the commutator 20. An orderly abutment of the sliding brush 18 against the commutator of the electric motor is obtained by a pressing spring 40 shown in FIG. 6. The pressing spring 40 is formed as a strip-shaped flat spring with both end portions rolled in opposite direction so as to form roller 42. A central portion 44 is located between both end portions with the rollers 42 and forms a base of a U-shape of the spring 40 when the roller 42 is partially rolled. The distance 46 between the legs of the U-shape substantially correspond to the width of the sliding brush 18 as shown in FIG. 6. The pressing spring can be fitted over the sliding brush 18 so that the central portion 44 of the pressing spring 40 abuts against an end surface 48 of the sliding brush 18, which end surfaces opposite to the sliding surface 34.

Figure 4:
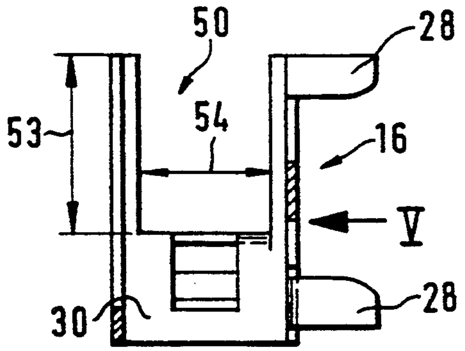
FIG. 4 is a view showing a section of the guiding container of FIG. 2 taken along the line IV—IV.

As shown in FIG. 4, the guiding container 16 has a recess 50 provided in each of its side walls 30 and opening toward an end of the guiding container 16 facing away from the commutator 20. The recesses 50 are formed so that supporting legs 52 are cut and bent from the side walls 30. The depth 53 of the recesses extends beyond the center of the length of the container 16. Their width 54 substantially corresponds to the width of the pressing spring 40. The legs 52 bend from the side walls 30 serve for supporting the rollers 42 of the pressing spring 40. Each supporting leg 52 in a transition region to its side wall is provided with a slot 58 shown in FIG. 3. The slot has a depth 60 which is at least equal to the width 56 of the pressing spring 40. It is clear that the depth 60 of the slot 58 is always smaller than the width of the leg 52 produced from the width 54 of the recesses 50. The slots 58 are open toward the side of the supporting leg 52 facing away from the support plate 12. One longitudinal side of the slot 58 opens toward the recess 50 located in its side wall 30, so that the slot 58 merges into the recess 50 adjacent to it.

Figure 2:
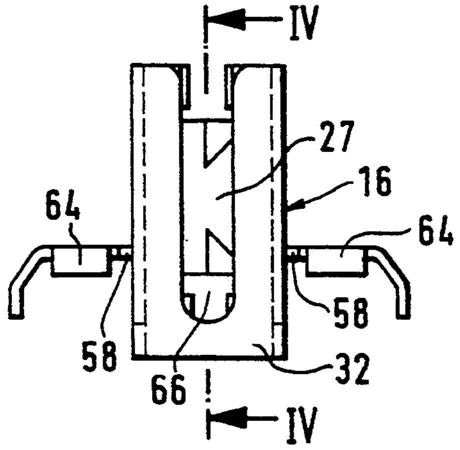
FIG. 2 is a view showing a section of the guiding container of FIG. 1, on an enlarged scale.
Figure 5:
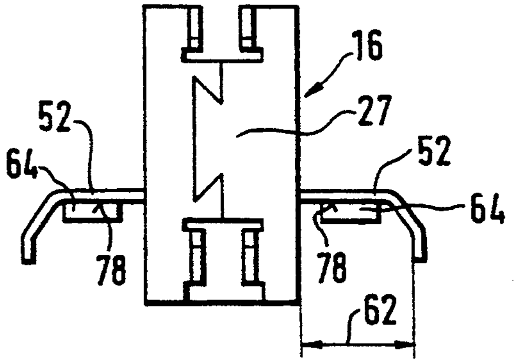
FIG. 5 is a view showing a guiding container in direction of the arrow V in FIG. 4.

The length 62 of the legs 52 is dimensioned so that they are greater than the radius of the rollers 42. The free end portions of the leg are bent so that their free ends extend substantially to the commutator 20. As can be seen further especially from FIGS. 2, 3 and 5, on the longitudinal edges of the supporting legs 52 by cutting the arrangement of fins can be seen, which extend from the collector 20 and form guiding abutments 64 for the rollers 42. FIGS. 1 and 2 further show that the front wall 32 of the guiding container 16 has a throughgoing slot 66 for the wire 26, which slot is open to the side of the guiding container 16 facing away from the commutator 20.

The mounting of the sliding brush 18 and the pressing spring 40 in or on the guiding container 16 will be explained in connection with the exploded view of FIG. 6. It should be mentioned that in practice the guiding container 16 is mounted on the support plate 12 by its bending tongue 28. The sliding brushes 18 are further displaced in direction of the arrow 17 in the guiding container 16 until its sliding surface 34 comes to abutment against the collector 20. Then the pressing spring 40 is rolled so that it obtains substantially a configuration shown in FIG. 6. Then the spring is fitted in direction of the arrow 74 over the guiding container 16, and the leg 76 of the U-shape extend in the slot 58 of the supporting leg 52. The pressing spring is inserted in the slot 58, until it abuts against the end edge of the slot 58. During the fitting of the pressing spring 40 it must be taken into consideration that the rollers 42 come to abutment against the support surfaces 78 of the legs 52 facing away from the commutator 20. In this operational position the pressing spring is secured between the end edges of the slot 58 and the associated guiding abutments 64 formed by the fins. In the thusly obtained operational position, the center portion 44 of the pressing spring 40 abuts against the end surface 48 of the sliding brush 18. Due to the partially rolled rollers 42 a pretensioning is obtained, by which the sliding brush is spring loaded in direction of the arrow 70 to the commutator 20.

The mounting of the inventive brush holder is relatively simple, since the pressing spring must no longer be threaded through the shaft of the guiding container, but instead it can be mounted from outside in direction of the arrow 75. In its mounted position it is located with its leg 76 in the recesses 50 of the side walls 30. With the progressive wear of the sliding brush 18 the current guiding wire 26 moves deeper into the throughgoing slot 66 in which during the above described mounting it is inserted in the guiding container 16 during insertion of the sliding brush 18.

It will be understood that each of the elements described above, or two or more together, may also find a useful application in other types of constructions differing from the types described above.

While the invention has been illustrated and described as embodied in a brush holder, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A brush holder for a mechanically commutated electric motor, comprising a support plate; a shaft-like guiding container mounted on said support plate for guiding a sliding brush pressed by a spring force against a commutator of an electric motor, said guiding container having side walls extending transverse to said support plate and provided with legs; a pressing spring formed as a strip-shaped flat spring having end portions which are oppositely rolled to form rollers abutting against said legs of said guiding container on surfaces of said legs which face the commutator and also having a central portion arranged to load an end surface of the sliding brush facing away from the commutator, said side walls of said guiding container being provided with recesses which are open toward an end facing away from the commutator, have a depth extending to said legs and have a width which is greater than a width of said pressing spring, each of said legs at a transition to a side wall of said guiding container being provided with a slot which is open toward a side of said leg facing away from said support plate, has a depth at least corresponding to said width of said pressing spring, and also has a longitudinal side merging into a recess located in a respective one of said side walls of said guiding container.

2. A brush holder as defined in claim 1, wherein said guiding container has a rear side facing toward said support plate and is provided at said rear side with bending tongues.

3. A brush holder as defined in claim 1, wherein said guiding container has a front side facing away from said support plate and provided with a throughgoing slot for a wire connectable with the sliding brush and a working current circuit of said electric motor, said throughgoing slot being open toward a side of said guiding container facing away from the commutator.

4. A brush holder as defined in claim 1, wherein said leg of said guiding container has a length which is greater than a radius of each of said rollers.

5. A brush holder as defined in claim 1, wherein said leg of said guiding container has a free end portion which is bent toward a respective one of said rollers.

* * * * *